United States Patent [19]
Yokoshima et al.

[11] Patent Number: 5,354,586
[45] Date of Patent: Oct. 11, 1994

[54] TUBULAR LINING MATERIAL AND A METHOD FOR IMPREGNATING THE SAME WITH A HARDENABLE RESIN

[75] Inventors: Yasuhiro Yokoshima, Ibaraki; Hiroyuki Aoki, Tokorozawa, both of Japan

[73] Assignees: Shonan Gosei-Jushi Seisakusho K.K., Kanagawa; Yokoshima & Company, Ibaraki; OAR Inc., Saitama, all of Japan

[21] Appl. No.: 987,488

[22] Filed: Dec. 7, 1992

[30] Foreign Application Priority Data

Dec. 6, 1991 [JP] Japan .................................. 3-348523

[51] Int. Cl.$^5$ .................... B29D 22/00; B29D 23/00; B32B 1/08
[52] U.S. Cl. .................... 428/36.1; 138/125; 138/145; 156/94; 156/287; 427/140; 427/238
[58] Field of Search ............... 427/140, 142, 230, 238, 427/239, 294, 295; 156/94, 287; 138/98, 153, 174, 125, 145; 428/34.5, 34.6, 34.7, 35.7, 36.1, 36.2, 36.91

[56] References Cited

U.S. PATENT DOCUMENTS

| | | | |
|---|---|---|---|
| 4,366,012 | 12/1982 | Wood | 156/287 X |
| 4,723,579 | 2/1988 | Hyodo et al. | 138/98 X |
| 5,077,107 | 12/1991 | Kaneda et al. | 138/98 X |
| 5,163,481 | 11/1992 | Catallo | 138/98 |
| 5,186,987 | 2/1993 | Imoto et al. | 156/287 X |

*Primary Examiner*—Michael Lusignan
*Attorney, Agent, or Firm*—Whitham, Curtis, Whitham & McGinn

[57] ABSTRACT

A tubular liner for lining the inner wall of a pipe such as sewer pipe made up of a flexible tubular resin-absorbent fabric to be impregnated with a thermosetting liquid resin and a tubular plastic film welded on the external surface of the tubular resin-absorbent fabric; also disclosed are the methods for making such tubular liner and for impregnating such tubular liner with the thermosetting liquid resin, and in particular the impregnation method is characterized by using a plurality of vacuum suction hoses.

9 Claims, 4 Drawing Sheets

TUBULAR LINING MATERIAL AND A METHOD FOR IMPREGNATING THE SAME WITH A HARDENABLE RESIN

BACKGROUND OF THE INVENTION

The present invention relates to a tubular lining material and a method for impregnating (soaking) the lining material with a thermosetting liquid resin, which material and method are employed in a repair operation on an old or defective pipe, such as a Hume concrete pipe, by newly lining the pipe internally with the lining material (flexible liner bag).

DESCRIPTION OF THE PRIOR ART

When an underground utility pipe or an underground industrial pipe, such as sewer pipe, gas pipe and electric conduit pipe, becomes defective or too old, the pipe is required and reinforced without digging the earth to expose the pipe and disassembling the sections of the pipe. This non-digging method of repairing an underground pipe has been known and practiced in the field of civil engineering. Typically, the method is disclosed by Japanese Provisional Patent Publication (Kokai) No. 60-242038.

According to the publication, this method of pipe repair comprises inserting a sufficiently long tubular flexible liner bag into the pipe to be repaired by means of a pressurized fluid, like air or water. The tubular liner bag is made of a flexible resin-absorbent material impregnated with a thermosetting resin, and has the outer surface covered with a hermetic plastic film. More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked at the end of the defective or old pipe in a manner such that the wideopened end of the liner completely and fixedly covers and closes the pipe end; a portion of the liner is pushed into the pipe; then, the pressurized fluid is applied to the said portion of the tubular liner such that the fluid urges the tubular liner to enter the pipe. since one end of the tubular liner is hooked at the end of the pipe, it remains there while the rest of the flexible liner bag is turned inside out as it proceeds deeper in the pipe. (Hereinafter, this manner of insertion shall be called "reversing".) When the entire length of the tubular liner bag is reversed (i.e., turned inside out) into the pipe, the control rope holds the closed end of the tubular liner bag to thereby control the length of the tubular liner in the pipe. Then, the reversed tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

Problems the Invention seeks to solve

Now, in such pipe repair method since the conventional tubular liner bag used is such that the tubular hermetic plastic film is not adhered to the surface of the tubular resin-absorbent material, the film would be loosened from the surface of the resin-absorbent material as the tubular liner bag is reversed in the pipe; as the result, the thin plastic film is detached from the resin-absorbent material and, not backed by the thick material, is liable to be torn apart as it receives the excessive tension exerted by the pressurized fluid. With such damaged plastic film, the resulting tubular liner tends to be poor in durability.

Also, as a method for impregnating the tubular resin-absorbent material with a thermosetting resin, there has been adopted a method wherein a single vacuum hose to suck in the air is inserted into the tubular resin-absorbent material from one end thereof until it almost reaches the other end, and an injector is placed to shoot the thermosetting resin into the tubular liner bag through said the other end thereof; thus the thermosetting resin is injected by the injector and drawn to penetrate into the resin-absorbent material by the vacuum hose, and as the impregnation develops the vacuum hose is gradually pulled back toward said one end of the tubular resin-absorbent material.

However, in this method, it was troublesome to pull back the vacuum hose; because if the hose is pulled back too fast, the impregnation does not occur sufficiently, and if the hose is pulled back too slowly, the resin is sucked into the hose. Thus, it was difficult to throughly and smoothly conduct the resin impregnation operation.

The present invention was contrived in view of the above problems, and it is, therefore, an object of the invention to provide a tubular lining material which has high durability and a method for impregnating the lining material with a hardenable resin which method enables smooth resin impregnation operation.

Means to solve the Problems

In order to attain the above and other objects of the invention, there is provided an improved tubular liner for lining the inner wall of a pipe, which liner comprises: a flexible tubular resin-absorbent fabric to be impregnated with a thermosetting liquid resin and a tubular plastic film welded on the external surface of said tubular resin-absorbent fabric.

In a preferred embodiment of such improved tubular liner, four portions of the tubular resin-absorbent fabric which correspond to the four corners of the race track-shaped cross section of the tubular liner when it is flattened are formed with a different material having a higher air permeability.

There is also proposed a method for making such tubular liner, which comprises the steps of: (i) inserting the flexible tubular resin-absorbent fabric into the tubular plastic film; (ii) drawing air from inside the tubular resin-absorbent fabric to thereby flatten the tube and cause the plastic film to be attracted onto the external surface of the tubular resin-absorbent fabric; and (iii) heating the plastic film until it is fused and welded on the external surface of the fabric.

Furthermore an improved method for impregnating such tubular liner with thermosetting resin is proposed which comprises the steps of: (i) inserting into the tubular liner a plurality of hoses connected to a vacuum pump via as many number of respective valves, from one end of the tubular liner, in a manner such that the free ends of the hoses are distanced from one another and arranged in a row along the length of the tubular liner at regular or irregular intervals; (ii) injecting a thermosetting liquid resin into the tubular liner from the other end thereof; (iii) operating the valves in a manner such that: at first only that hose whose end is the closest to said end of the tubular liner from which the resin is injected communicates with the vacuum pump to thereby excited to draw air; and, thereafter, one after another, only that hose whose free end is next closest to said end of the tubular liner after the immediately previously excited hose communicates with the vacuum pump to thereby draw air; and this sequence is continued until only the hose whose end is the farthest from said end of the tubular liner communicates with the vacuum pump to thereby draw air.

Effects

In the tubular liner of the present invention, the plastic film is firmly united with the resin-absorbent fabric, so that when the tubular liner bag is reversed into a pipe to be repaired, the plastic film does not get loose from the tubular liner but stays on the outer surface of the liner; consequently, the plastic film is always backed by the liner and is not torn apart by the excessive tension that works on the film. Thus, the durability of the liner is improved.

Also, according to the resin impregnation method of the invention, a plural number of vacuum hoses are inserted in the tublar liner, and their free ends are distanced from others by appropriate intervals, and as the impregnation of the tubular liner with the thermosetting resin progresses, the connection of the vacuum hoses with the vacuum suction pump is switched over selectively opening and closing the respective valves that are provided between the vacuum hoses and the suction pump, so that it is now possible to change the position of vacuum suction form left end portion to the right end portion progressively, as the impregnation progresses, without pulling back the vacuum hose. As the result, the resin impregnation is effected smoothly and the operation becomes simpler.

The above and other objects and features of the invention will appear more fully hereinafter in the following description given in connection with the accompanying drawings and the novelty thereof pointed out in the appended claims.

EMBODIMENTS

Next, an embodiment of the invention, which is considered the best mode, will be described with reference to the attached drawings.

Figure 1:
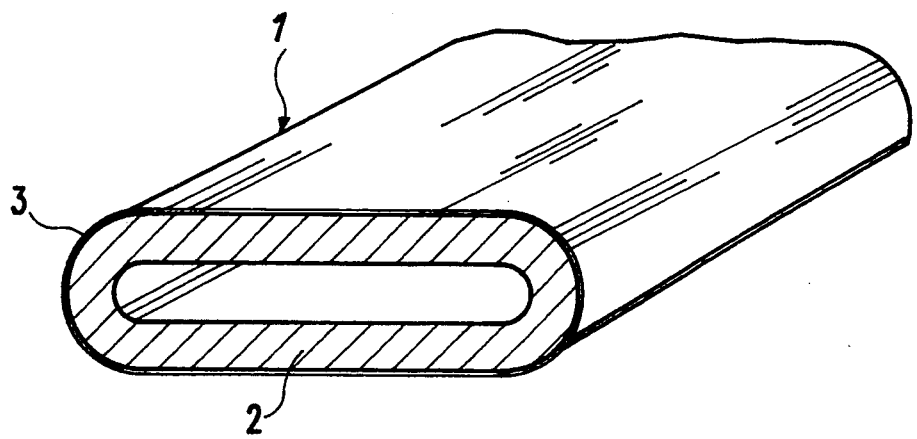
FIG. 1 is a perspective view of a flexible tubular liner bag according to an embodiment of the invention.

FIG. 1 is a perspective view of a flexible tubular liner bag 1 according to the invention, and FIG. 2 through FIG. 5 are show the sequence of the method for manufacturing the tubular liner bag 1.

As shown in FIG. 1, the tubular liner bag 1, according to the invention, consists of a tubular resin-absorbent nonwoven fabric 2 of a material such as polyester, acrylic resin, nylon and polypropyrene, which 2 is closely coated externally with a hermetic tubular plastic film 3 of a material such as polyethylene, nylon-polyethylene copolymer, EVA and polypropyrene; such tubular liner bag 1 is fabricated in the following manner.

Figure 2:
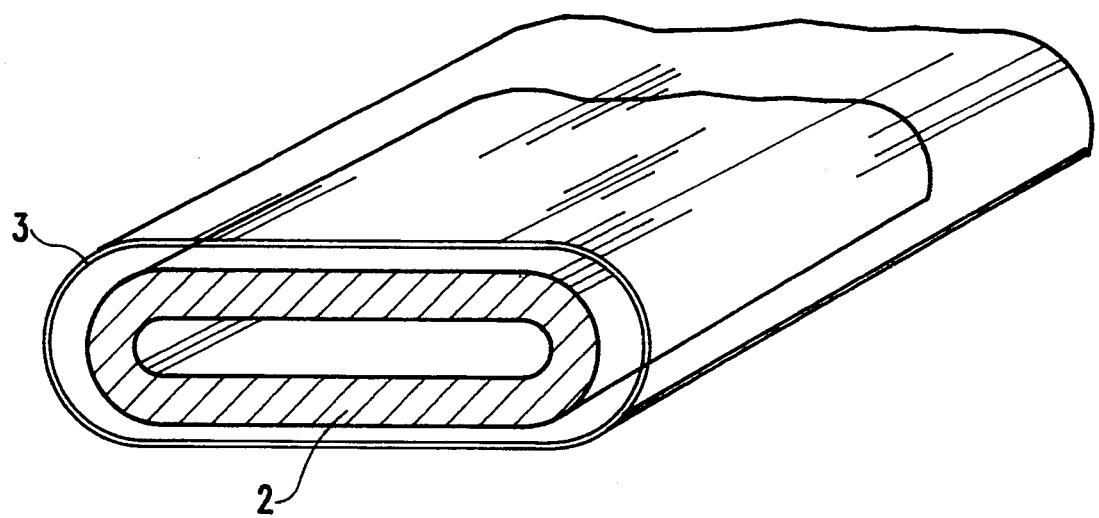
FIG. 2 is a drawing to show a step of the method for manufacturing the tubular liner bag.
Figure 3:
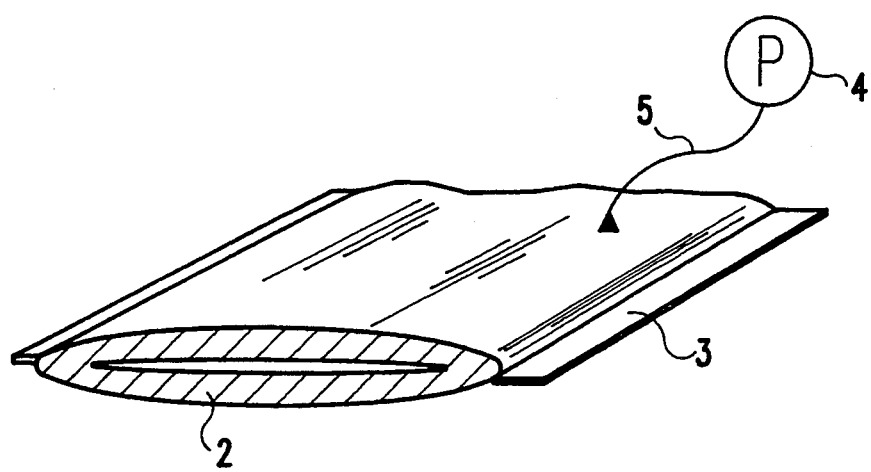
FIG. 3 is a drawing to show a step of the method for manufacturing the tubular liner bag.

As shown in FIG. 2, the resin-absorbent nonwoven fabric 2 is inserted in the tubular plastic film 3 having a slightly greater diameter than the tubular fabric 2; next, as shown in FIG. 3, a vacuum hose 5 leading out from a vacuum suction pump 4 is connected to the resin-absorbent fabric 2, and the suction pump 4 is operated to draw air from the fabric 2. As the fabric 2 is thus sucked, the plastic film 3 is drawn and fits closely onto the outer surface of the fabric 2.

Figure 4:
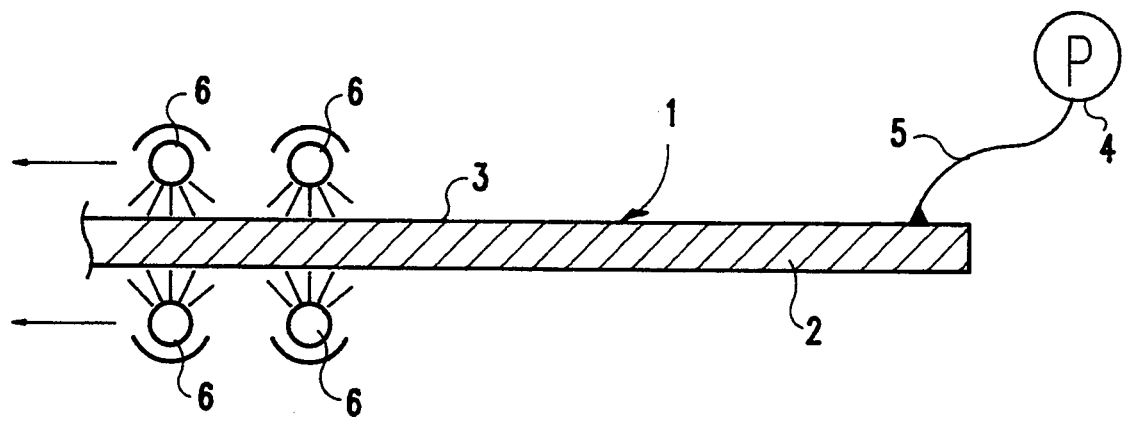
FIG. 4 is a drawing to show a step of the method for manufacturing the tubular liner bag.

Then, as shown in FIG. 4, a plurality of heaters 6, half of which are held over the film-coated fabric 2 and the other half of which are held below the fabric 2, are moved along the tubular fabric 2 in the direction indicated by the arrows, so that the entire length of the plastic film 3 is heated and fused to unite itself with the fabric 2; thus, the tubular liner bag 1 as shown in FIG. 1 is obtained. Incidentally, the heaters 6 may be stream heaters or electric beaters.

Figure 5:
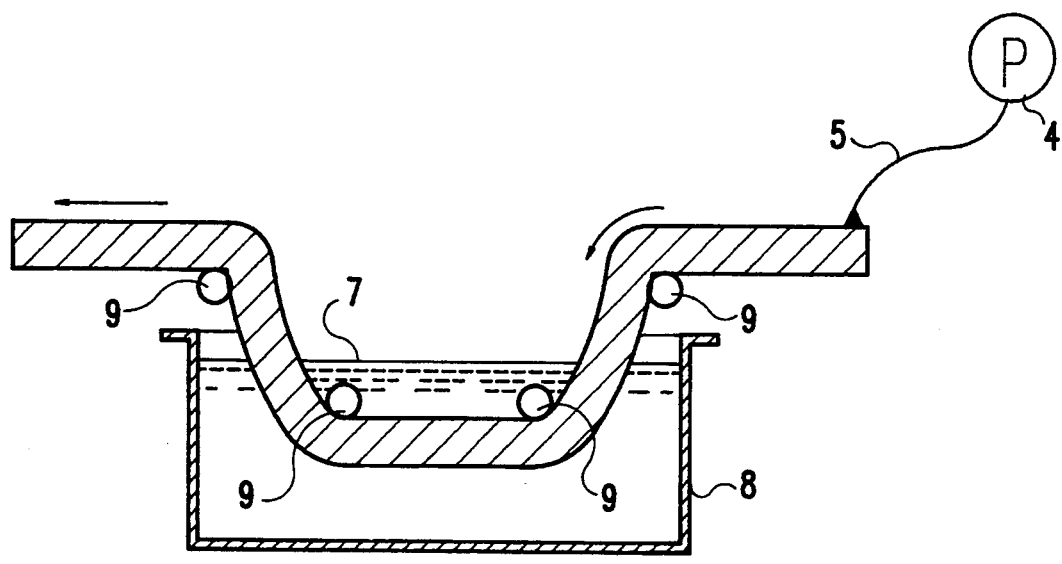
FIG. 5 is a drawing to show a step of the method for manufacturing the tubular liner bag.

Alternatively, heating and fusing of the plastic film 3 may be effected by passing the resin-absorbent fabric 2 and the closely fitting plastic film 3 in a heating medium such as hot oil and hot water. This alternative procedure can be effectively conducted in an apparatus as shown in FIG. 5, wherein a tank 8 contains the heating fluid and a plurality of rollers to guide the fabric 2 and the film 3.

As described above, in the tubular liner bag 1 of the present invention, since the plastic film 3 is fused to unite itself with the resin-absorbent fabric 2, the plastic film 3 does not get loose from the resin-absorbent fabric 2 when the tubular liner bag 1 is reversed into a pipe, not shown, so that the plastic film 3 is always backed and supported by the resin-absorbent fabric 2 and the excessive tension that works on the plastic film 3 cannot tear the latter, and thus the durability of the resulting tubular liner bag 1 is improved.

Next, with reference to FIGS. 6 and 7, the method for impregnating the resin-absorbent fabric 2 of the tubular liner bag 1 with a thermosetting resin will be described. Incidentally, FIG. 6 is a sectional side elevation of the tubular liner bag 1 as it is being impregnated with the resin, and FIG. 7 is a schematic view of the tubular liner bag 1 after the impregnation.

Figure 6:
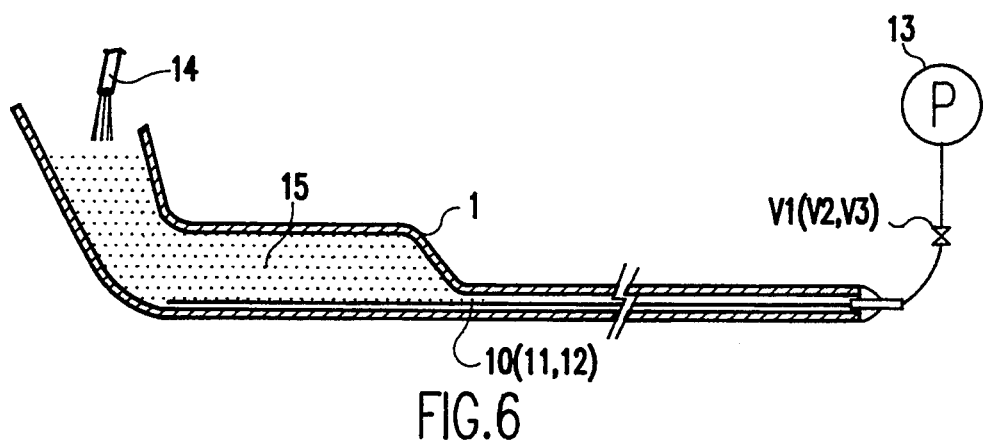
FIG. 6 is a sectional side elevation of the tubular liner bag to show the resin impregnation method according to an embodiment of the invention.
Figure 7:
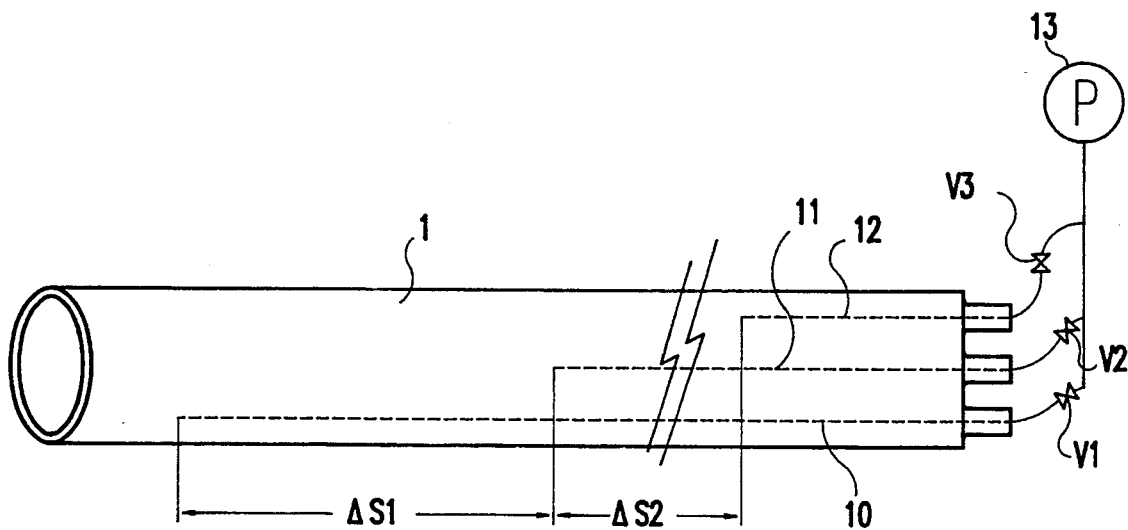
FIG. 7 is a schematic view of the tubular liner bag to show the arrangement of the elements.

In this embodiment, three vacuum hoses 10, 11, 12 of different lengths are inserted in the tubular liner bag 1 from one end of the liner bag 1 (the right end as seen in FIG. 6) and they extend lengthwise of the tubular bag 1: as shown in FIG. 7, the hose 10 extends the farthest, the hose 11 shorter, and the hose 12 the shortest. The distance between the open ends of hoses 10 and 11 is ΔS1, and that between the open ends of hoses 11 and 12 is ΔS2. ΔS1 and ΔS2 are preferably 20 to 30 meters. These vacuum hoses 10, 11, 12 are connected to a vacuum suction pump 13 by way of valves V1, V2, V3, respectively. From the other end of the tubular bag 1 is injected a predetermined amount of the thermosetting resin 15 into the bag 1 via a hose 14.

In the present embodiment, the tubular liner bag 1 is impregnated with the thermosetting resin from the left end, as viewed in FIG. 6. At first, only the valve V1 is opened and the other valves V2 and V3 are closed, so that when the vacuum suction pump 13 is driven, the longest vacuum hose 10 starts sucking the air in the left end portion of the tubular liner bag 1 creating negative pressure there, whereby the the thermosetting resin 15 is drawn to soak the left end portion of the tubular liner bag 1. When the left end portion of the tubular liner bag 1 is thus impregnated with the resin 15, the valve V1 is closed and the valve V2 is opened, so that on this occasion when the vacuum suction pump 13 is driven, only the second longest vacuum hose 11 starts drawing the air and the resin 15 penetrates into the middle portion of the tubular liner bag 1. When the middle portion of the tubular liner bag 1 is thus saturated with the resin 15, the valve V2 is closed and the valve V3 is opened, so that this time only the shortest vacuum hose 12 sucks the air and thus the right end portion of the tubular liner bag 1 is soaked with the resin 15. Hence, the entire length of the tubular liner bag 1 is impregnated with the thermosetting resin 15.

As described above, in the resin impregnation method of the present invention, three vacuum hoses are used and their open ends are distanced from each other by appropriate intervals: ΔS1 between the hoses 10 and 11; ΔS2 between the hoses 11 and 12. As the impregnation of the tubular liner bag 1 with the thermosetting resin 15 progresses, the connection of the vacuum hoses 10, 11, 12 with the vacuum suction pump 13 is switched over by selectively opening and closing the valves V1, V2, and V3, so that it is possible to change the position of vacuum suction from left end portion to the right end portion progressively, as the impregnation progresses, and as the result, the resin impregnation is effected smoothly. Furthermore, since there is no need of pulling back the vacuum hose, the operation can be conducted with improved simplicity and efficiency.

Figure 8:
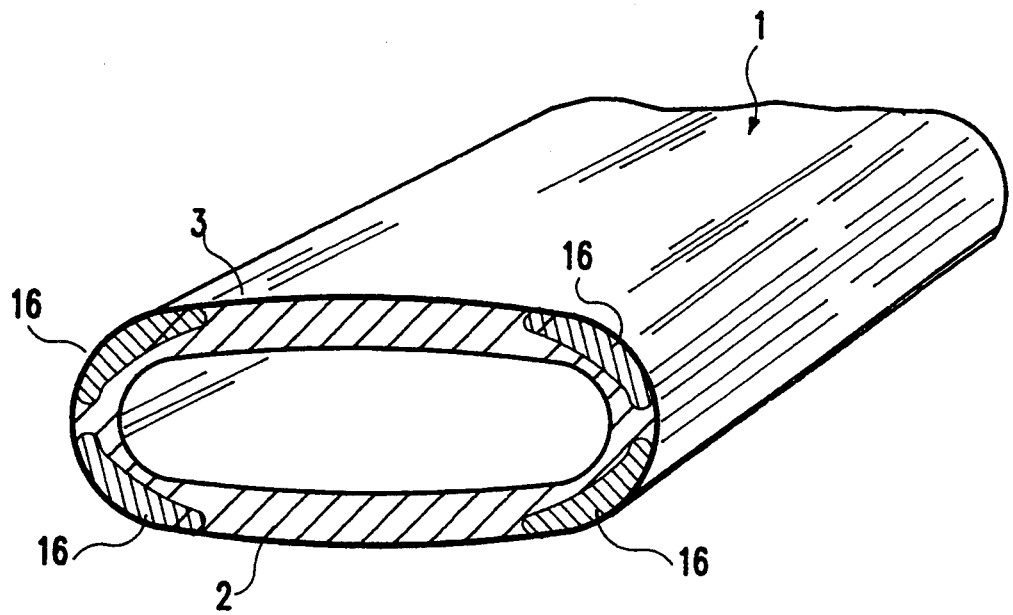
FIG. 8 is a perspective view of a flexible tubular liner bag according to another embodiment of the invention.

In practice, however, the thermosetting resin does not soak well into the portions of the tubular resin-absorbent fabric 2 corresponding to the four corners of the race track-shaped cross section of the tubular liner bag 1; therefore, those portions are formed with a different material 16 which has a higher gas permeability, as shown in FIG. 8. As the result, these portions 16 provide broad air passages as the air is drawn to the vacuum hose, and negative pressure is created there whereby the thermosetting resin 15 is drawn to soak those parts sufficiently.

Figure 9:
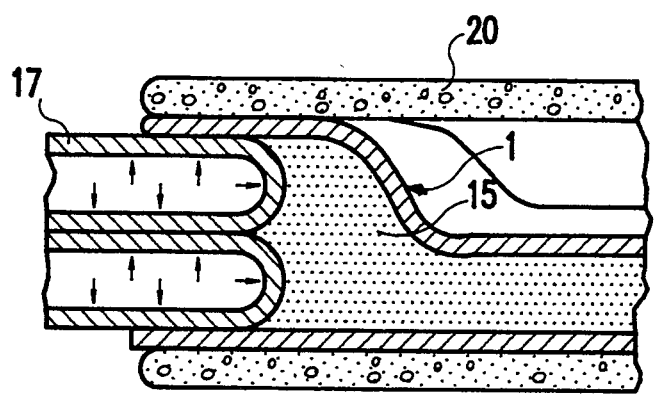
FIG. 9 is a sectional side elevation of the tubular liner bag to show the resin impregnation method according to another embodiment of the invention.

Incidentally, the above embodiment is in the case where the resin-impregnation operation is conducted on the ground; but, when it is desired to have the thermosetting resin 15 permeate into the fabric of a tubular liner bag 1 which has already been pulled into an underground pipe 20, then, the resin-impregnation operation is conducted in the following manner. As shown in FIG. 9, an appropriate amount of the resin 15 is at first charged into the liner bag 1; then, an open liner bag 17 is reversed into the liner bag 1 by means of a pressurized fluid whereby the liner bag 1 is inflated and the thermosetting resin 15 is pushed into the fabric of the liner bag 1.

Result of the Invention

As is clear from the description of the above embodiment of the invention, in the tubular liner bag of the invention, the plastic film is firmly united with the resin-absorbent fabric, so that when the tubular liner bag is reversed into a pipe to be repaired, the plastic film does not get loose from the tubular liner bag but stays on the outer surface of the liner bag; consequently, the plastic film is not torn apart by the excessive tension that works on the film.

Also, according to the resin impregnation method of the invention, a plural number of vacuum hoses are lain inside the tubular liner bag, and their open ends are distanced from others by appropriate intervals, and as the impregnation of the tubular liner bag with the thermosetting resin progresses, the connection of the vacuum hoses with the vacuum suction pump is switched over by selectively opening and closing the respective valves that are provided between the vacuum hoses and the suction pump, so that it is not possible to change the position of vacuum suction from left end portion to the right end portion progressively, as the impregnation progresses, without pulling back the vacuum hose. As the result, the resin impregnation is effected smoothly and the operation becomes simpler.

While the invention has been described in its preferred embodiment, it is to be understood that modifications will occur to those skilled in that art without departing from the spirit of the invention. The scope of the invention is therefore to be determined solely by the appended claims.

What is claimed is:

1. A tubular liner for lining the inner wall of a pipe, which liner comprises:
   a flexible tubular resin-absorbent fabric and a tubular plastic film welded on the external surface of said tubular resin-absorbent fabric, wherein at least one portion of the tubular resin-absorbent fabric is formed of a material having a higher air permeability than the remainder of said resin-absorbent fabric.

2. The tubular liner as claimed in claim 1, wherein four portions of the tubular resin-absorbent fabric, which correspond to the four corners of the race track-shaped cross section of the tubular liner, when said tubular liner is flattened, are formed of a material having a higher air permeability than the remainder of said resin-absorbent fabric.

3. A method for making a tubular liner for lining the inner wall of a pipe, comprising the steps of: (i) inserting a flexible tubular resin-absorbent fabric into a tubular plastic film; (ii) drawing air from inside said tubular resin-absorbent fabric to thereby flatten the tube and cause the plastic film to be attracted onto the external surface of said tubular resin-absorbent fabric; and (iii) heating said plastic film until it is fused and welded on the external surface of said fabric.

4. A method as recited in claim 3, wherein said step of heating said plastic film includes the step of applying steam heat to said plastic film.

5. A method as recited in claim 3, wherein said step of heating said plastic film includes the step of electrically heating said plastic film.

6. A method as recited in claim 3, wherein said step of heating said plastic film includes the step of passing said tubular liner through a heating medium.

7. A method as recited in claim 6, wherein said heating medium includes at least one of hot water and hot oil.

8. A method for impregnating a tubular liner for lining the inner wall of a pipe, made up of a flexible tubular resin-absorbent fabric and a tubular plastic film welded on the external surface of said tubular resin-absorbent fabric, said method comprising the steps of: (i) inserting into said tubular liner a plurality of hoses connected to a vacuum pump via a like plurality of respective valves, from one end of the tubular liner, in a manner such that the free ends of the hoses are distanced from one another and arranged in a row along the length of the tubular liner at regular or irregular intervals; (ii) injecting a thermosetting liquid resin into said tubular liner from the other end thereof; (iii) operating said valves in a manner such that: at first only that hose whose end is the closest to said end of the tubular liner from which the resin is injected communicates with the vacuum pump to thereby draw air; and, thereafter, one after another, only that hose whose free end is next closest to said end of the tubular liner after the immediately previously excited hose communicates with the vacuum pump to thereby draw air; and this sequence is continued until only the hose whose end is the farthest from said end of the tubular liner communicates with the vacuum pump to thereby drew air.

9. The method as claimed in claim 8 wherein the intervals between the next closest free ends of the hoses are 20 to 30 meters.

* * * * *